(12) United States Patent
Suzuki et al.

(10) Patent No.: US 7,232,394 B2
(45) Date of Patent: Jun. 19, 2007

(54) DRIVE UNIT FOR AUTOMATIC TRANSMISSION

(75) Inventors: Fuminori Suzuki, Okazaki (JP); Akira Takagi, Obu (JP)

(73) Assignee: Denso Corporation, Kariya, Aichi-pref. (JP)

( * ) Notice: Subject to any disclaimer, the term of this patent is extended or adjusted under 35 U.S.C. 154(b) by 263 days.

(21) Appl. No.: 11/130,208

(22) Filed: May 17, 2005

(65) Prior Publication Data
US 2005/0261110 A1    Nov. 24, 2005

(30) Foreign Application Priority Data
May 20, 2004  (JP) ............................. 2004-150267

(51) Int. Cl.
*F16H 59/08* (2006.01)

(52) U.S. Cl. .................................................. 475/131
(58) Field of Classification Search .................. 475/131
See application file for complete search history.

(56) References Cited

U.S. PATENT DOCUMENTS 5,167,311 A * 12/1992 Satoh et al. .................. 192/73
5,257,188 A * 10/1993 Sakakibara et al. ........... 701/53
5,894,758 A *  4/1999 Walker ......................... 74/335
6,209,408 B1 *  4/2001 DeJonge et al. .......... 74/473.12
6,564,662 B2 *  5/2003 Yamamoto et al. ....... 74/473.12

FOREIGN PATENT DOCUMENTS

JP           7-301309          11/1995

* cited by examiner

*Primary Examiner*—Sherry Estremsky
(74) *Attorney, Agent, or Firm*—Nixon & Vanderhye P.C.

(57) ABSTRACT

A drive unit for an automatic transmission has a hydraulic circuit changing device for changing a hydraulic circuit so that one of the hydraulic control portions (hydraulic gear change portions) is selectively communicated with an oil pressure source, a position detecting device for continuously detecting a position of one of moving members of the hydraulic circuit changing device and for outputting a detection signal corresponding to the position of the moving member, and a pressure regulating device provided between the hydraulic circuit changing device and the hydraulic control portions for regulating a control pressure to be applied to the hydraulic control portions. In the above drive unit, an electronic control unit calculates a rate of changes in the detection signals from the position detecting device and controls the pressure regulating device in accordance with the rate of the changes in the detection signals.

8 Claims, 8 Drawing Sheets

STROKE AMOUNT

FIG. 4B

DETECTION SIGNAL

FIG. 4C

SUPPLY OIL PRESSURE

FIG. 4D

COMMAND VALUES

FIG. 4E

CONTROL OIL PRESSURE

FIG. 8A
PRIOR ART
STROKE AMOUNT

FIG. 8B
PRIOR ART
DETECTION SIGNAL

FIG. 8C
PRIOR ART
SUPPLY OIL PRESSURE

FIG. 8D
PRIOR ART
COMMAND VALUES

FIG. 8E
PRIOR ART
CONTROL OIL PRESSURE

FIG. 9
PRIOR ART

DRIVE UNIT FOR AUTOMATIC TRANSMISSION

CROSS REFERENCE TO RELATED APPLICATION

This application is based on Japanese Patent Application No. 2004-150267, which is filed on May 20, 2004, the disclosure of which is incorporated herein by reference.

FIELD OF THE INVENTION

The present invention relates to a drive unit for an automatic transmission for a motor vehicle, in which a gear change is implemented by changing over a hydraulic circuit of the automatic transmission.

BACKGROUND OF THE INVENTION

Figure 6:
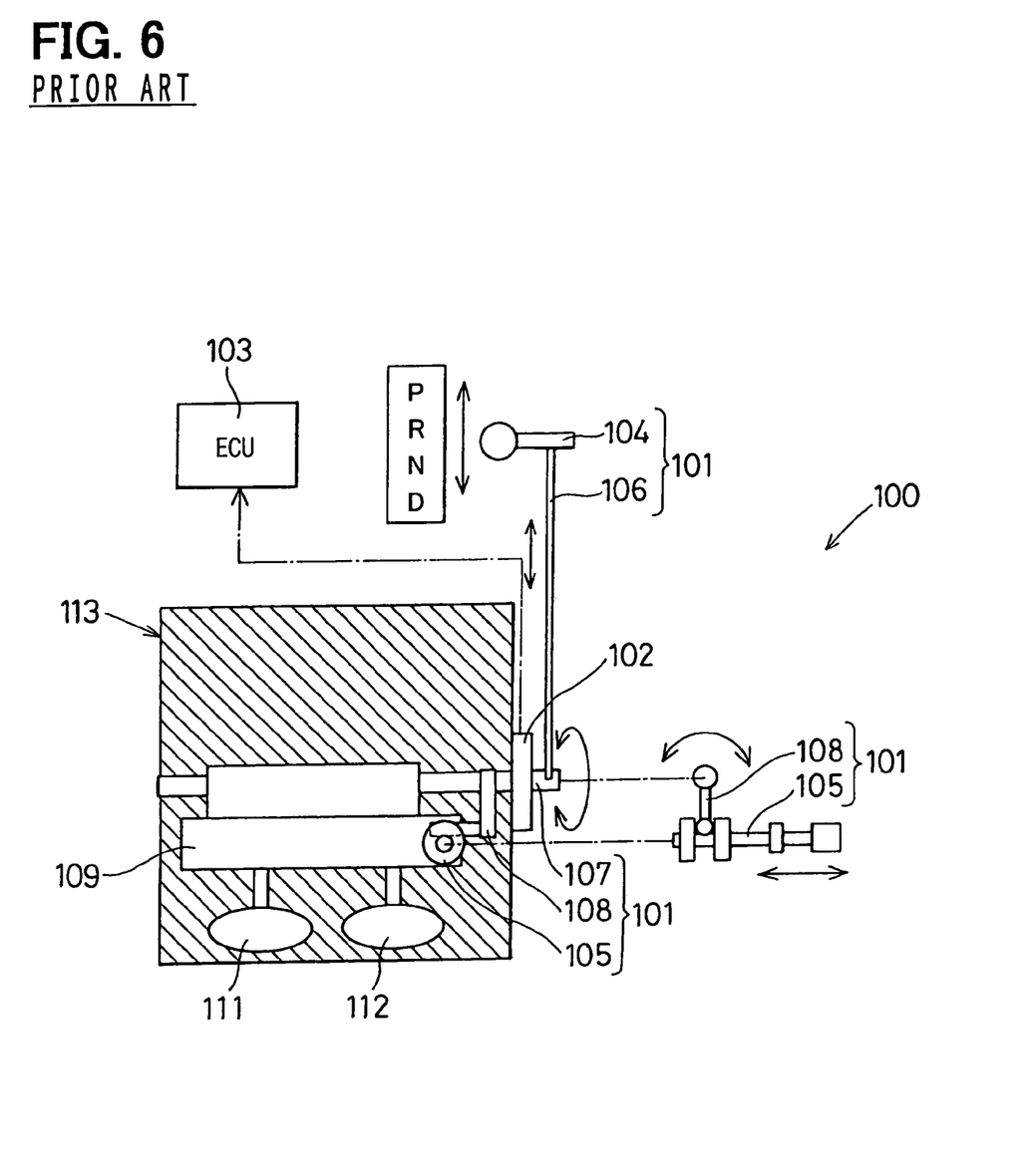
FIG. 6 is a schematic view showing a conventional drive unit for an automatic transmission device.
Figure 7:
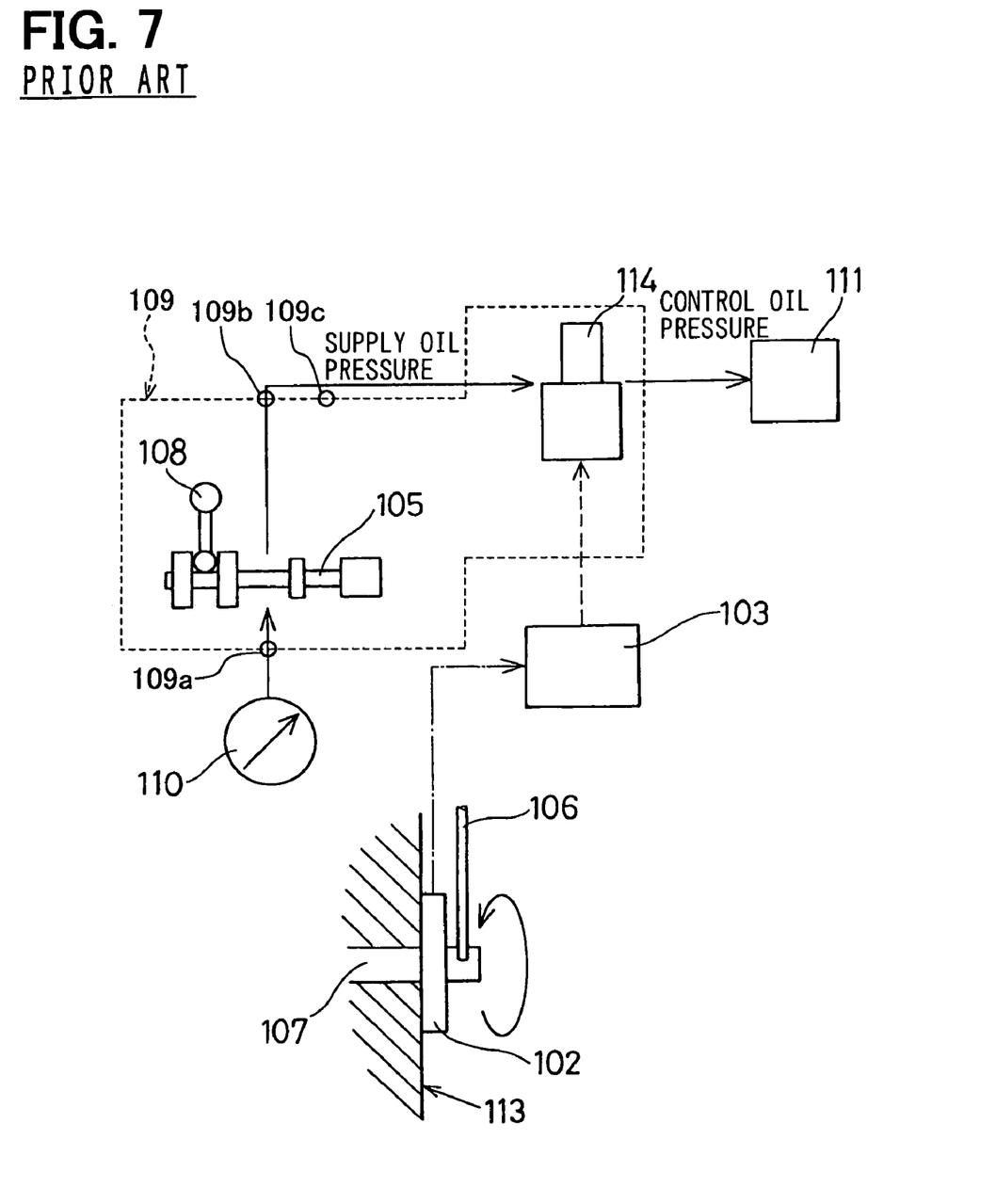
FIG. 7 is a schematic view showing a hydraulic circuit from an oil pressure source to a hydraulic gear change portion in the conventional drive unit shown in FIG. 6.

A drive unit for an automatic transmission changes over a hydraulic circuit of the automatic transmission, to implement the gear change. A conventional drive unit of this kind, for example, as shown in FIGS. 6 and 7, has a hydraulic circuit changing device 101 to be manually operated by a shift lever 104 and to change a hydraulic control portion (gear change portions 111 and 112), to which oil pressure is applied. The drive unit 100 further has a position detecting device 102 for continuously detecting a position of a movable member (a spool 105), which is a part of the hydraulic circuit changing device 101, and outputting a detection signal indicating the position of the movable member (which corresponds to an amount of movement of the spool driven by the shift lever 104). An electronic control unit 103 of the drive unit 100 determines the hydraulic gear change portion to which the oil pressure is applied, based on the detection signal from the position detecting device 102, and controls the oil pressure. (In this specification, the drive unit for mechanically changing over the hydraulic circuit in accordance with a shift lever movement by a vehicle-driver is referred to as a "mechanically operated type drive unit".)

A movable portion of the hydraulic circuit changing device 101 comprises the shift lever 104 operated by the vehicle driver and the spool 105 linearly moved by the shift lever 104. The movable portion of the hydraulic circuit changing device 101 further comprises a control wire 106 connected at its one end to the shift lever 104 and at its other end to a shaft 107, which is rotated in a synchronized manner with the shift lever 104. The movable portion further comprises a valve lever 108, which is swung by the shaft 107. An operational force of the shift lever 104 is mechanically transmitted to the spool 105 through the above movable portion.

The spool 105 is movably held in a body 109 of an automatic transmission device 113, so that the spool 105 is linearly moved back and forth in the body 109 in accordance with the operational force of the shift lever 104. As schematically shown in FIG. 7, the body 109 of the automatic transmission device has an inlet port 109a connected to an oil pressure source 110 and multiple outlet ports 109b and 109c, which are respectively connected to the multiple hydraulic control portions (more specifically, to a gear change portion 111 for a forward drive, and to a gear change portion 112 for a backward drive). The outlet port 109b is referred to as a "D" port connected to the gear change portion 111 for the forward drive, while the outlet port 109c is referred to as a "R" port connected to the gear change portion 112 for the backward drive. When the spool 105 is linearly moved back and forth, the "D" port 109b or "R" port 109c is selectively connected to the oil pressure source 110. FIG. 7 shows a condition, in which the gear change portion 111 is connected to the oil pressure source 110 through the "D" port 109b.

The position detecting device 102, for example as disclosed in Japanese Patent Publication No.H7-301309, is provided at an outside of the automatic transmission device 113, and comprises a rotating member (not shown) integrally formed with the shaft 107, and a distance sensor (not shown) for outputting an electrical signal corresponding to a distance between the sensor and an outer periphery of the rotating member. The electrical signal corresponding to a rotational angle (the rotational position) of the shaft 107 can be outputted to the electronic control unit (ECU) 103.

As already described above, the electronic control unit 103 determines the hydraulic control portion (the gear change portion 111 or the gear change portion 112), to which the oil pressure is applied, based on the detection signal from the position detecting device 102.

Figure 8A:
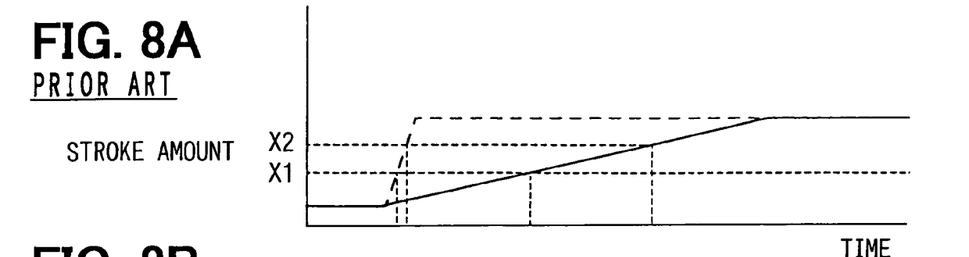
FIGS. 8A to 8E are diagrams showing a detection signal and a control signal as well as pressure changes with respect to a time change in the conventional drive unit.
Figure 8B:
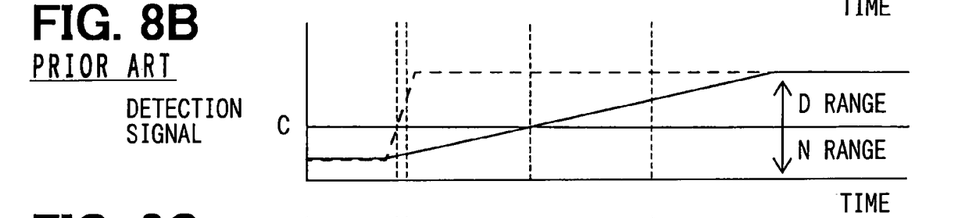

More specifically, the ECU 103 determines that the inlet port 109a is connected to neither "D" port 109b nor "R" port 109c, when the detection signal of the position detecting device 102 is lower than a predetermined level "C", as shown in FIG. 8B. When the detection signal is lower than the predetermined level "C", the ECU 103 determines that the shift lever 104 is positioned at a "N" range (a neutral range). When the detection signal is higher than the predetermined level "C", the ECU 103 determines that the inlet port 109a is connected to the "D" port 109b (which corresponds to a condition that the shift lever 104 is positioned at a "D" range (a drive range)). When the detection signal of the position detecting device 102 is changed from the "N" range to the "D" range, the ECU 103 determines that inlet port 109a is connected to the "D" port 109b. The ECU 103 then controls the oil pressure (also referred to as a control pressure) to be applied to the gear change portion 111 for the forward drive.

The ECU controls the control pressure, in order to alleviate an impact which would be caused by a rapid supply of a working oil to the gear change portion 111. For the purpose, a pressure regulating valve 114 is provided in a hydraulic circuit from the "D" port 109b to the gear change portion 111, as shown in FIG. 7, so that an opening degree of the valve 114 is controlled in accordance with a current supply to a solenoid (not shown) of the valve 114. The ECU 103 changes a command value for controlling the current supply in accordance with a predetermined control program, so that the opening degree of the pressure regulating valve 114 is gradually increased to prevent the oil pressure at an upstream side of the pressure regulating valve 114 from rapidly applied to the gear change portion 111. The oil supply pressure is increased by supplying the working oil from the oil pressure source 110 to the upstream side of the pressure regulating valve 114 through the inlet port 109a and the outlet port 109b (the "D" port 109b).

Figure 8C:
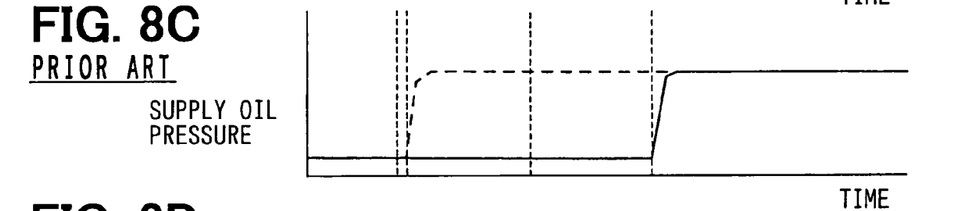

As seen from FIGS. 8B and 8C, the outlet port ("D" port) 109b is communicated with the inlet port 109a only after the detected position signal from the position detecting device 102 exceeds the predetermined level "C" (i.e. the shift lever 104 is changed from the "N" range to the "D" range. Accordingly, the oil supply pressure to the pressure regulating valve 114 is increased (through the communication between the inlet port 109a and the "D" port 109b), only after the control process for the pressure control valve 114 has started. In a normal operation of the shift lever 104 by the vehicle driver, the shift lever 104 is usually moved quickly. However, if the shift lever 104 is intentionally moved very slowly, the above drive unit for the automatic transmission device has the following problems.

In FIGS. 8A to 8E, a timing point, at which the detected position signal from the position detecting device 102 is changed from the "N" range to the "D" range in the normal shift operation of the shift lever 104, is indicated by "t1a", and a timing point, at which the "D" port 109b is actually communicated with the inlet port 109a in the normal shift operation of the shift lever 104, is indicated by "t2a". A timing point, at which the detected position signal from the position detecting device 102 is changed from the "N" range to the "D" range in the intentional slow shift operation of the shift lever 104, is indicated by "t1b", and a timing point, at which the "D" port 109b is actually communicated with the inlet port 109a in the intentional slow shift operation of the shift lever 104, is indicated by "t2b". In FIGS. 8A to 8E, dotted lines indicate respective operational conditions with respect to time change in the case of the normal shift operation, whereas solid lines indicate the respective operational conditions with respect to the time change in the case of the intentional slow shift operation.

A moving speed of the movable portion, such as the shift lever 104 and the related elements (the spool 105 and so on), becomes extremely slower in the intentional slow shift operation, than that in the normal shift operation.

In FIG. 8A, "X1" is a threshold level of a stroke amount of the shift lever 104, at which the ECU 103 determines that the shift lever 104 is moved from the "N" range to the "D" range based on the detected position signal from the detecting device 102, namely the ECU 103 determines that the "D" port 109b is communicated with the inlet port 109a. "X2" is, on the other hand, a stroke amount of the shift lever 104, at which the "D" port 109b is actually communicated with the inlet port 109a. As indicated in FIG. 8A, the stroke amounts of "X1" and "X2" are the same in both of the normal shift operation and the intentional slow shift operation.

The drive unit has a delay time in its operation, which is a time period from the timing point ("t1a" or "t1b") at which the ECU 103 determines that the shift lever 104 is moved from the "N" range to the "D" range to the timing point ("t2a" or "t2b") at which the "D" port 109b is actually communicated with the inlet port 109a. And the time delay (t2b–t1b) in the case of the intentional slow shift operation becomes much larger than the time delay (t2a–t1a) in the case of the normal shift operation.

As a result, in the case of the intentional slow shift operation, the "D" port 109b is actually communicated with the inlet port 109a, with a considerable time delay, after the ECU 103 has determined that the "D" port 109b is communicated with the inlet port 109a. In such a case, as shown in FIG. 8C, the oil supply pressure is actually increased only at the timing point of "t2b", in spite that the ECU 103 has already determined at the timing point of "t1b" that the "D" port 109b was communicated with the inlet port 109a.

Figure 8D:
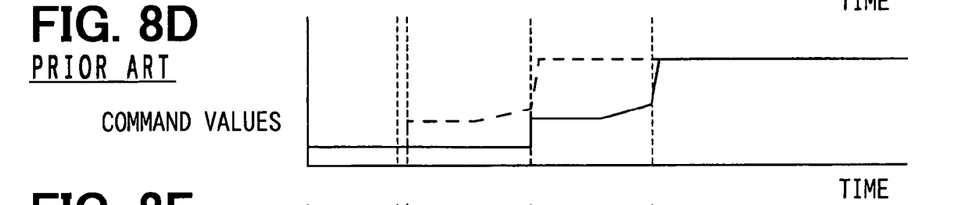
Figure 8E:
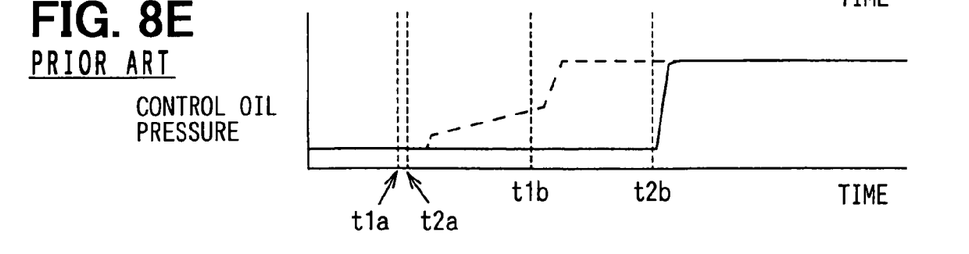

As shown in FIG. 8D, the ECU 103 starts its control program for the command signal, as soon as it determines the "D" port 109b is communicated with the inlet port 109a, namely when the detected position signal is changed from the "N" range to the "D" range, irrespectively whether it is in the normal shift operation or the intentional slow shift operation. Accordingly, the opening degree of the pressure regulating valve 114 has already become large, when "D" port 109b is actually communicated with the inlet port 109a. Then, the control pressure to the gear change portion 111 is rapidly increased, as shown in FIG. 8E, to cause an impact in the automatic transmission device.

Figure 9:
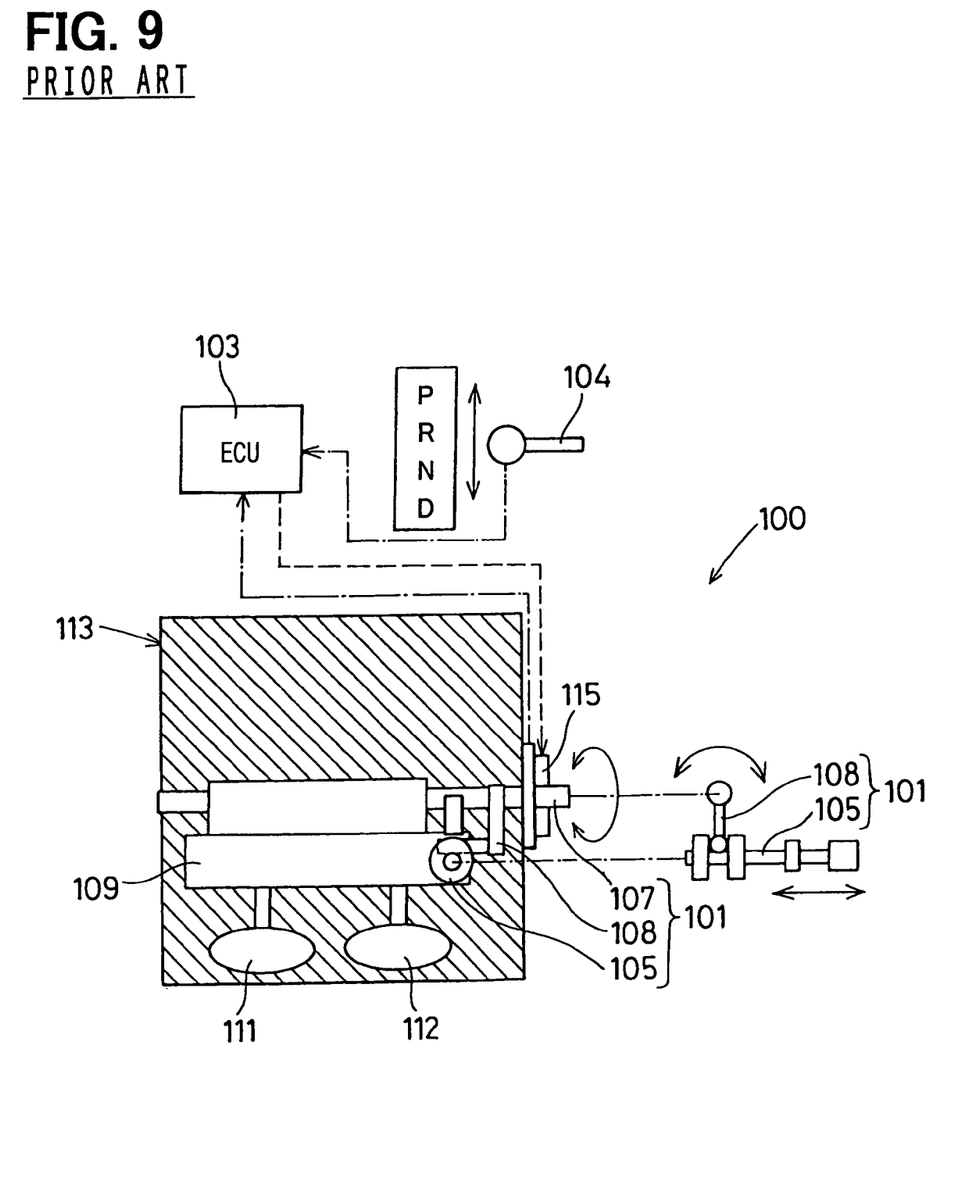
FIG. 9 is a schematic view showing another conventional drive unit for an automatic transmission device.

FIG. 9 also shows another conventional drive unit 100 for the automatic transmission device, in which an electronically operated type drive unit is used. In the electronically operated type drive unit, a movable portion (such as the spool 105) is operated by an electrical actuator 115 (e.g. an electric motor). The electrical actuator 115 is controlled by the ECU 103 in accordance with the shift lever change.

The above explained impact caused in the mechanically operated type drive unit (FIGS. 6 & 7) may also happen in the electronically operated type drive unit (FIG. 9), as in the similar manner.

SUMMARY OF THE INVENTION

The present invention is made in view of the above problems. It is an object of the present invention to provide a drive unit for an automatic transmission of a motor vehicle, in which an impact caused by a rapid supply of working oil to hydraulic gear control portions is prevented, even when a shift lever is intentionally slowly moved by a vehicle driver.

According to a feature of the present invention, a drive unit for an automatic transmission has a hydraulic circuit changing device for changing a hydraulic circuit so that one of the hydraulic control portions (hydraulic gear change portions for a forward drive and for a backward drive) is selectively communicated with an oil pressure source, a position detecting device for continuously detecting a position of one of moving members of the hydraulic circuit changing device and for outputting a detection signal corresponding to the position of the moving member, and a pressure regulating device provided between the hydraulic circuit changing device and the hydraulic control portions for regulating a control pressure to be applied to the hydraulic control portions. In the above drive unit, an electronic control unit calculates a rate of changes in the detection signals from the position detecting device and controls the pressure regulating device in accordance with the rate of the changes in the detection signals, so that a rapid supply of the working oil to the hydraulic gear control portions is prevented.

According to another feature of the present invention, the hydraulic circuit changing device comprises a spool movingly held in a body of the automatic transmission device and linearly moved in accordance with an operation of a shift lever operated by a vehicle driver, so that the hydraulic circuit is selectively changed to one of the hydraulic control portions. In the above drive unit, the position of the spool is detected by the position detecting device, to calculate the rate of changes in the detection signals from the position detecting device.

According to a further feature of the present invention, the pressure regulating device is controlled by the electronic control unit after the one of the hydraulic circuits is actually communicated with the oil pressure source through the hydraulic circuit changing device, so that the rapid increase of the control pressure to be applied to the hydraulic gear control portion is prevented.

According to a still further feature of the present invention, the electronic control unit estimates a necessary time period from the present time point to a time point at which the detection signal reaches a predetermined value, based on the calculated rate of the changes of the detection signal, and the electronic control unit controls the pressure regulating device only after the estimated necessary time period has passed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

A drive unit for an automatic transmission device according to a first embodiment of the present invention will now be explained with reference to FIGS. 1 and 2.

Figure 1:
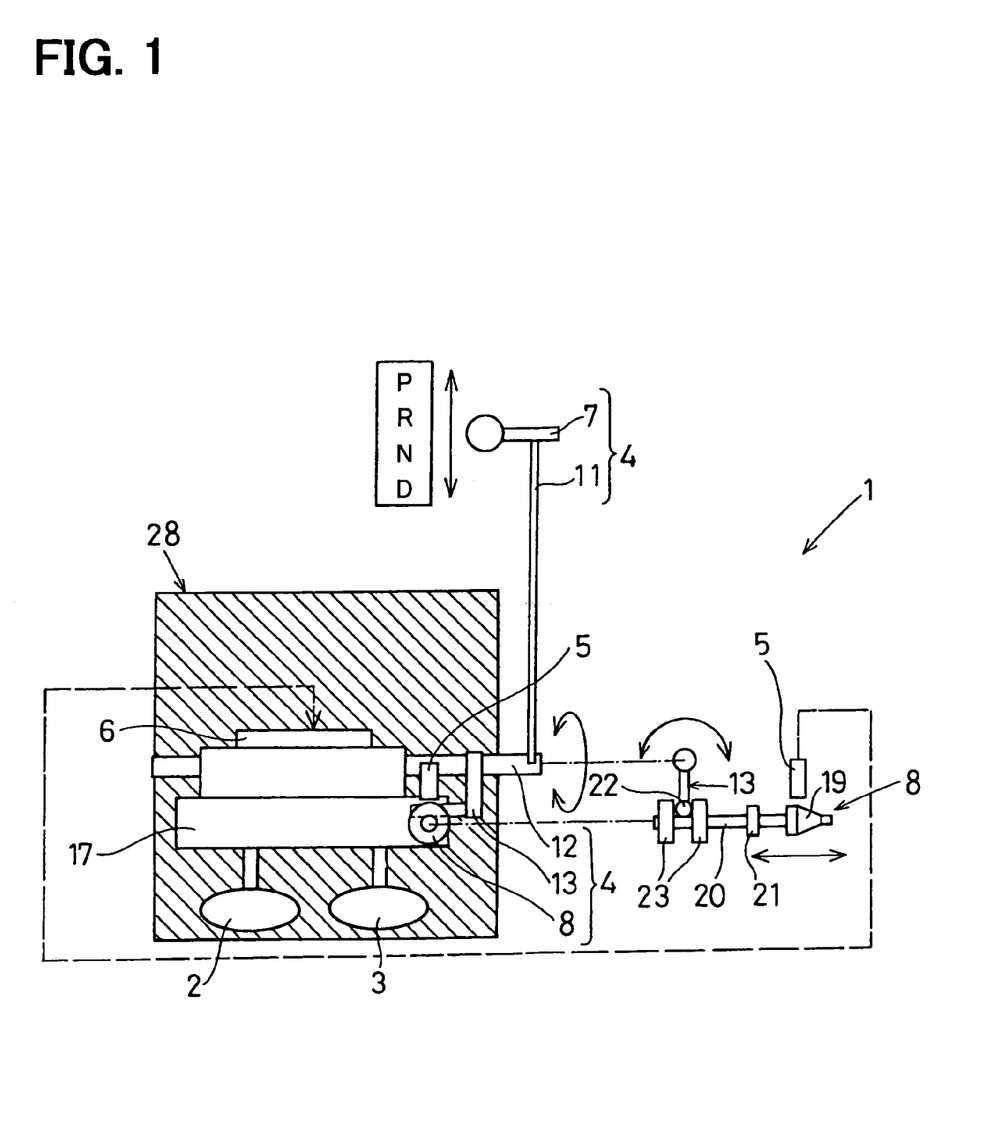
FIG. 1 is a schematic view showing a drive unit for an automatic transmission device according to a first embodiment of the present invention.
Figure 2:
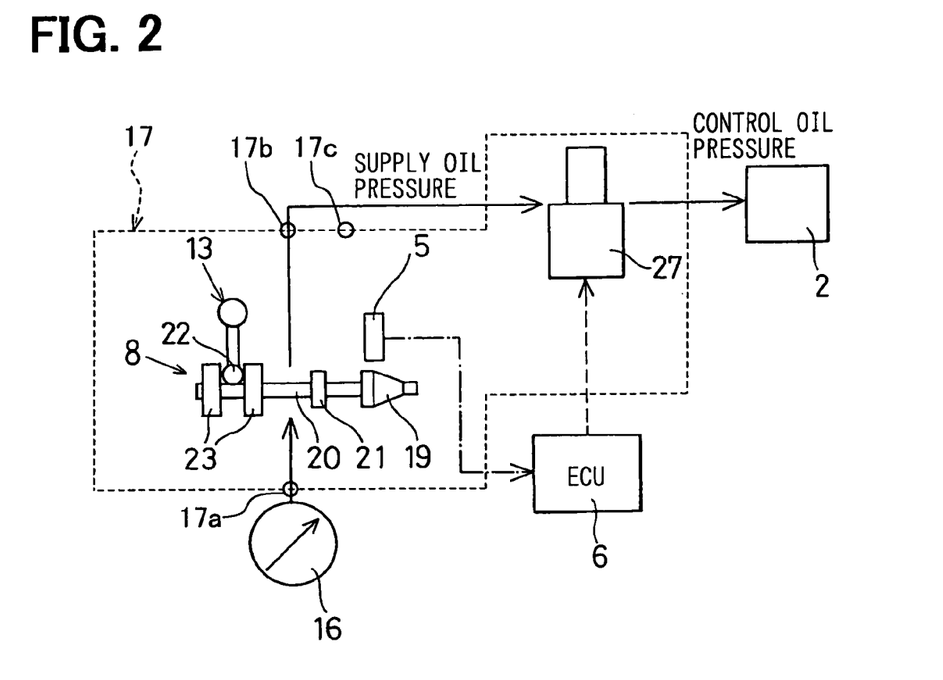
FIG. 2 is a schematic view showing a hydraulic circuit from an oil pressure source to a hydraulic gear change portion in the first embodiment.

In FIG. 1, a drive unit 1 of an automatic transmission device 28 for a motor vehicle changes over a hydraulic control portion, such as a hydraulic gear change portion ("D" portion) 2 for a forward drive and a hydraulic gear change portion ("R" portion) 3 for a backward drive of the motor vehicle, so that a gear change of the automatic transmission device is hydraulically implemented.

The drive unit 1 of the first embodiment is a mechanically operated type drive unit, which comprises a hydraulic circuit changing device 4 (which is also referred to as a mechanical changing device), a position detecting device 5 and an electronic control unit 6.

The hydraulic circuit changing device (mechanical changing device) 4 comprises a shift lever 7 operated by a vehicle driver, and a spool 8 linearly moved by the shift lever 7. The hydraulic circuit changing device 4 further comprises a control wire 11 connected at its one end to the shift lever 7 and at its other end to a shaft 12, which is rotated in a synchronized manner with the shift lever 7. The hydraulic circuit changing device 4 further comprises a valve lever 13, which is swung by the shaft 12. An operational force of the shift lever 7 is mechanically transmitted to the spool 8 through the above movable members (11, 12 and 13).

The spool 8 is movably held in a body 17 of an automatic transmission device 28, so that the spool 8 is linearly moved back and forth in the body 17 in accordance with the operational force of the shift lever 7. As schematically shown in FIG. 2, the body 17 of the automatic transmission device 28 has an inlet port 17a connected to an oil pressure source 16 and multiple outlet ports 17b and 17c respectively connected to the multiple hydraulic control portions (the hydraulic gear change portion 2 for the forward drive, and the hydraulic gear change portion 3 for the backward drive). The outlet port 17b is referred to as a "D" port connected to the hydraulic gear change portion 2 for the forward drive, while the outlet port 17c is referred to as a "R" port connected to the hydraulic gear change portion 3 for the backward drive. When the spool 8 is linearly moved back and forth, the "D" port 17b or "R" port 17c is selectively connected to the oil pressure source 16. FIG. 2 shows a condition in which the hydraulic gear change portion 2 is connected to the oil pressure source 16 through the "D" port 17b.

The spool 8 has a tapered portion 19 at its one end, wherein an outer diameter of the tapered portion 19 is gradually decreased toward its end. The spool 18 further has a large diameter portion 21 which is larger in its diameter than a shaft portion 20, and a pair of collar portions 23 which receive a forward end 22 of the valve lever 13. The outer peripheries of the tapered portion 19 and the large diameter portion 21 are slidingly held in a cylindrical bore (not shown) of the body 17. When the spool 8 is linearly moved back and forth in the cylindrical bore, the inlet port 17a and the outlet ports 17b and 17c are opened and/or closed by the outer peripheries of the tapered portion 19 and the large diameter portion 21, in a well known manner.

The position detecting device 5 is, for example, a gap sensor provided in the body 17 in such a manner that the gap sensor protrudes in the cylindrical bore toward the tapered portion 19. The gap sensor 5 detects a position (a stroke amount) of the spool 8. The stroke amount is an amount of movement of the spool 8 in its axial direction from a reference position. The gap sensor 5 comprises, for example, a hall IC type sensor or an eddy current type sensor, and outputs a detection signal to the ECU 6, corresponding to a distance in a radial direction between the sensor and an outer side surface of the tapered portion 19. The tapered portion is formed of a conical surface, so that the values of the detection signal and the amount of the stroke are related by a linear function.

The ECU 6 controls the oil pressure to be applied to the hydraulic control portions (the hydraulic gear control portions) 2 and 3 in accordance with the detection signal from the gap sensor 5, in order to alleviate an impact which would be caused by a rapid supply of the working oil to the hydraulic gear change portions 2 and 3. For the purpose, a pressure regulating valve 27 is provided in a hydraulic circuit from the "D" port 17b to the hydraulic gear change portion 2, as shown in FIG. 2, so that an opening degree of the valve 27 is controlled in accordance with a current supply to a solenoid (not shown) of the valve 27. Another pressure regulating valve (not shown) is likewise provided in a hydraulic circuit from the "R" port 17c to the hydraulic gear change portion 3.

The ECU 6 controls the pressure regulating valve 27 to gradually open its passage to prevent a control oil pressure from being rapidly supplied to the hydraulic gear change portion 2. The supply oil pressure is increased by supplying the working oil from the oil pressure source 16 to the upstream side of the pressure regulating valve 27 through the inlet port 17a and the outlet port 17b (the "D" port 17b).

The ECU 6 changes a command value for controlling the current supply to the solenoid of the pressure control valve 27 in accordance with a predetermined control program, so that the opening degree of the pressure regulating valve 27 is gradually increased.

Figure 4A:
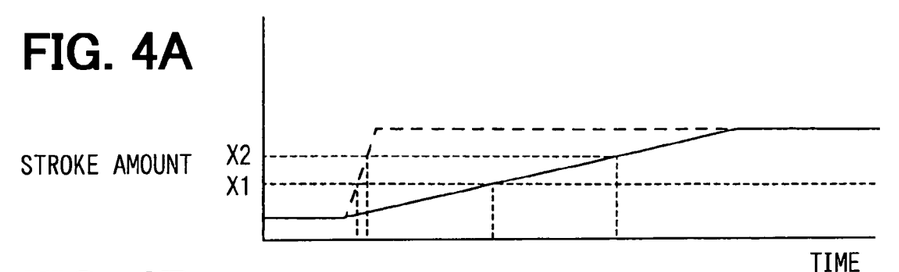
FIGS. 4A to 4E are diagrams showing a detection signal and a control signal as well as pressure changes with respect to a time change.
Figure 4B:
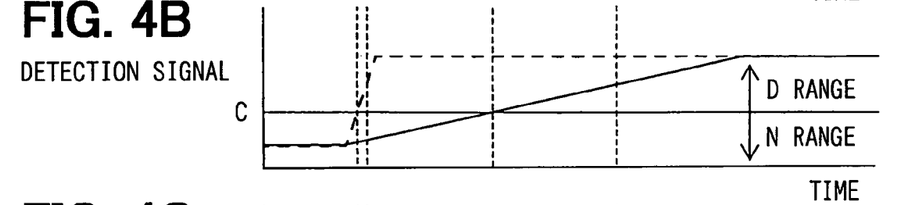

The ECU 6 determines whether the shift lever 7 is positioned in a "N" range or in a "D" range based on the detection signal from the position detecting device 5, by comparing the detection signal with a predetermined threshold value "C", as shown in FIG. 4B.

When the value of the detection signal begins to increase in the "N" range, namely when the vehicle driver begins a shift operation from the "N" position to the "D" position, the ECU implements its control process, as described below.

The ECU 6 is arranged in the inside of the automatic transmission device 28, as shown in FIG. 1.

Figure 3:
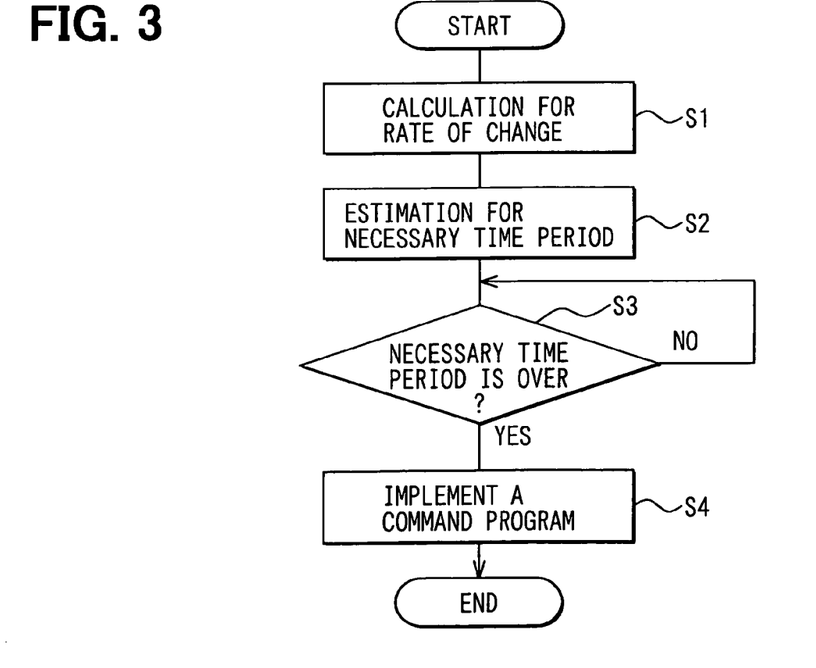
FIG. 3 is a control flow chart showing an operational process for controlling the drive unit of the first embodiment.

An operation of the drive unit by the ECU 6 is explained with reference to the flow chart shown in FIG. 3.

At a step S1, the ECU 6 calculates a rate of change in the detection signals from the position detecting device 5. Namely, the ECU 6 calculates the rate of the changes of the detection signals with respect to a time change, when the value of the detection signal begins to increase in the "N" range. The rate of the changes in the detection signals corresponds to a rate of changes in the stroke amounts of the spool 8.

At a step S2, the ECU 6 estimates a necessary time period from the present time point to a time point at which the "D" port 17b will be actually communicated with the inlet port 17a. More specifically, at the step S2, the ECU 6 calculates the above necessary time period, based on the rate of the changes in the detection signals, the present value of the detection signal, and an estimated value of the detection signal after the necessary time period. The above estimated value of the detection signal after the necessary time period is in advance decided in accordance with the past actual values for the necessary time periods and/or laboratory data obtained when assembling the automatic transmission device At a step S3, the ECU 6 determines whether the necessary time period calculated at the step S2 has passed or not. When YES at the step S3, namely when the ECU 6 determines that the necessary time period has passed, the process goes to a step S4, at which a program for the command signal to the pressure regulating valve 27 is implemented. In the program, the command value at the beginning of the valve control operation is made lower than the command value at the end of the valve control operation, and the command value is gradually increased from the beginning to the end of the valve control operation, as shown in FIG. 4D, so that the opening degree of the pressure regulating valve 27 is gradually increased.

In FIGS. 4A to 4E, as in the same manner to FIGS. 8A to 8E, "t1a" is a timing point, at which the detected position signal from the position detecting device 5 is changed from the "N" range to the "D" range in the normal shift operation of the shift lever 7, and "t2a" is a timing point, at which the "D" port 17b is actually communicated with the inlet port 17a in the normal shift operation of the shift lever 7. "t1b" is a timing point, at which the detected position signal from the position detecting device 5 is changed from the "N" range to the "D" range in the intentional slow shift operation of the shift lever 7, whereas "t2b" is a timing point, at which the "D" port 17b is actually communicated with the inlet port 17a in the intentional slow shift operation of the shift lever 7.

And dotted lines indicate respective operational conditions with respect to time change in the case of the normal shift operation, whereas solid lines indicate the respective operational conditions with respect to the time change in the case of the intentional slow shift operation.

"X1" is a threshold level of a stroke amount of the shift lever 7, at which the ECU 6 determines that the shift lever 7 is moved from the "N" range to the "D" range based on the detected position signal from the detecting device 5, namely the ECU 103 determines that the "D" port 17b is communicated with the inlet port 17a. "X2" is, on the other hand, a stroke amount of the shift lever 7, at which the "D" port 17b is actually communicated with the inlet port 17a.

When the vehicle driver moves the shift lever 7 from the "N" position to the "D" position, the stroke amount of the spool 8 begins to increase, as shown in FIG. 4A. Then, the value of the detection signal from the position detecting device 5 likewise begins to increase, as shown in FIG. 4B. And the control process of FIG. 3 starts its operation.

Figure 4C:
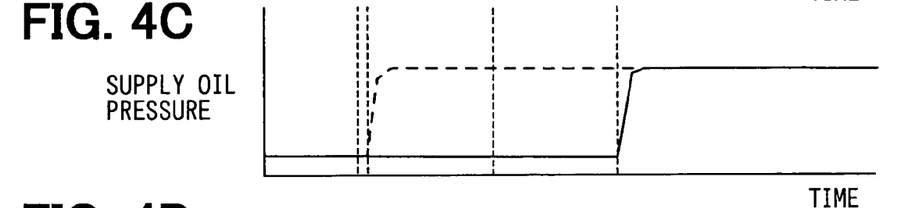
Figure 4D:
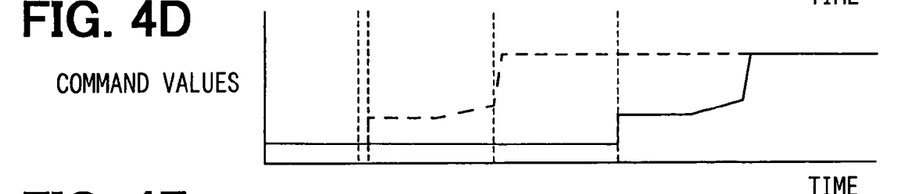

When the stroke amount comes to the position of "X2", the "D" port 17b actually becomes in communication with the inlet port 17a, and the supply oil pressure to the pressure regulating valve 27 is increased at the timing point of the "t2a" in the normal shift operation, as shown in FIG. 4C.

Figure 4E:
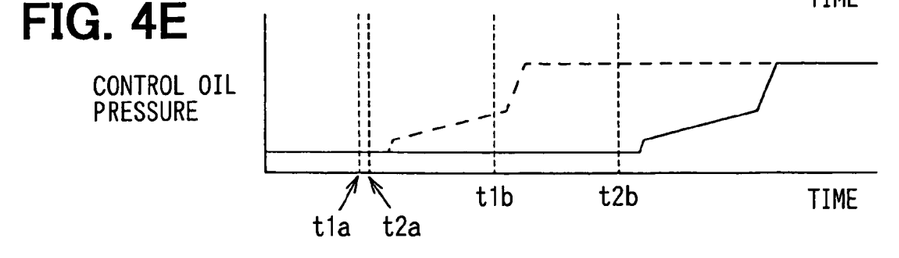

When the necessary time period has passed (at the step S3 in FIG. 3), the program for the command signal is implemented, so that the command signal as shown in FIG. 4D is outputted to the pressure regulating valve 27. As a result, the control oil pressure in the hydraulic control portion (the hydraulic gear control portion) 2 is slowly increased, as shown in FIG. 4E. The control oil pressure finally becomes equal to the supply oil pressure.

In the above embodiment of the present invention, even when the shift lever 7 is intentionally slowly moved from the "N" position to the "D" position, the implementation of the program for the command signal is delayed depending on such a slow shift operation (in accordance with the rate of the change in the detected position signals), so that the supply of the oil pressure to the hydraulic gear change portion 2 is accordingly delayed.

More specifically, the delay time (t2b–t1b) in the case of the intentional slow shift operation becomes considerably a large value, when compared with the delay time (t2a–t1a) in the case of the normal shift operation. However, at the step S2 of FIG. 3, the ECU 6 calculates the necessary time period based on the rate of the changes in the detection signals, so that the necessary time period becomes longer as the rate of the changes in the detection signals becomes smaller. As a result, the supply of the oil pressure to the hydraulic gear change portion 2 can be properly performed, irrespectively of the speed of the shift lever movement. And thereby the impact, which would be otherwise caused by the rapid increase of the control oil pressure to the hydraulic gear change portion, can be prevented.

Second Embodiment

Figure 5:
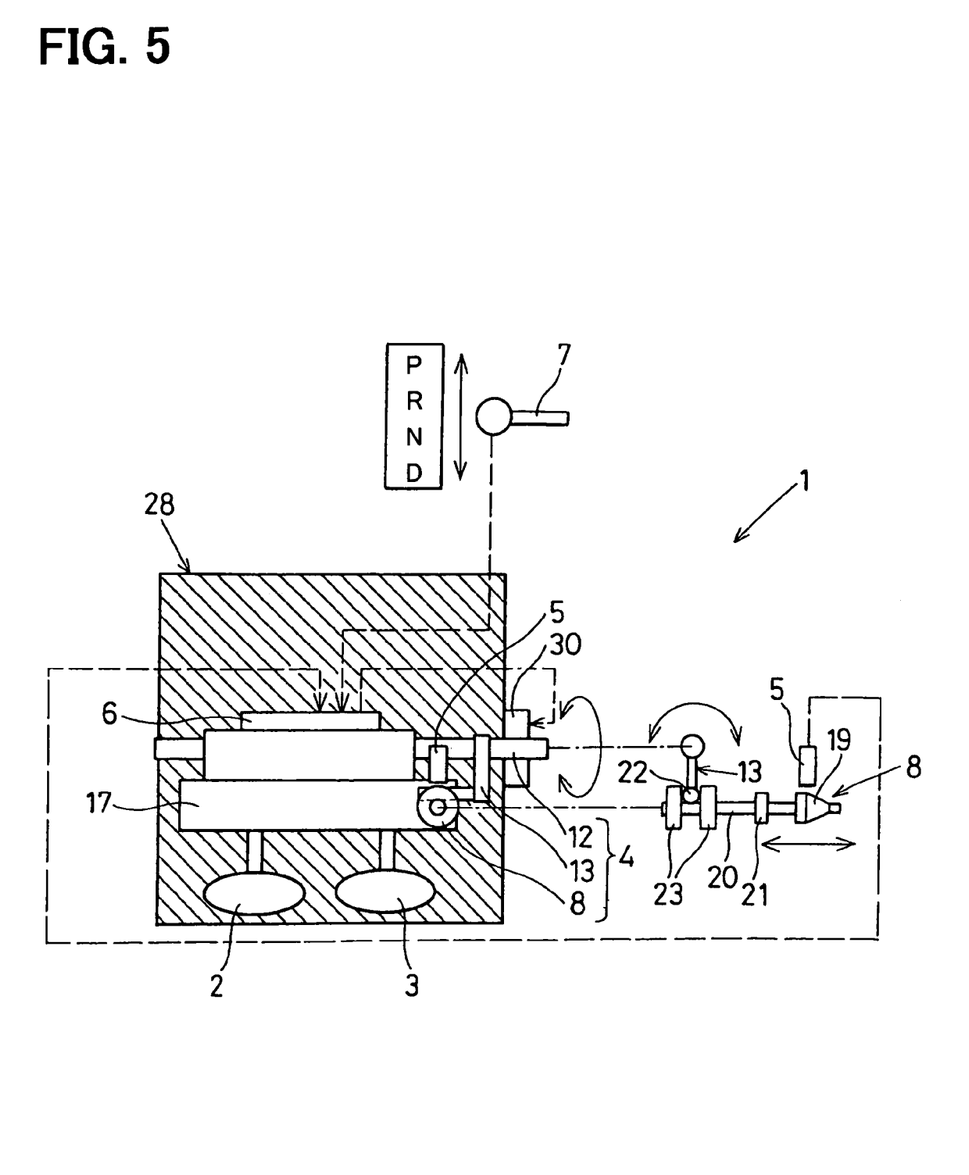
FIG. 5 is a schematic view showing a drive unit for an automatic transmission device according to a second embodiment of the present invention.

The present invention can be used to the electronically operated type drive unit for the automatic transmission device. As shown in FIG. 5, the drive unit 1 comprises a hydraulic circuit changing device 4, a position detecting device 5 and an electronic control unit 6, wherein the second embodiment differs from the first embodiment in that the valve lever 13 of the second embodiment is driven by an electrical actuator (an electric motor) 30 instead of the control wire 11 of the first embodiment. The other structure of the second embodiment is the same to the first embodiment.

In the second embodiment, the ECU 6 also calculates the necessary time period based on the rate of the changes in the detection signals, so that the necessary time period becomes longer as the rate of the changes in the detection signals becomes smaller, as in the same manner to the first embodiment. The supply of the oil pressure to the hydraulic gear change portion 2 can be properly performed, irrespectively of the speed of the shift lever movement. And thereby the impact, which would be otherwise caused by the rapid increase of the control oil pressure to the hydraulic gear change portion, can be prevented.

In the above embodiments, the stroke amount of the spool 8 is detected by the position detecting device 5. However, any other moving stroke or moving angle of the components (the moving members) of the hydraulic circuit changing device, such as the valve lever 13 and the shaft 12, or the swinging amount of the forward end 22 of the valve lever 13 can be detected.

Further, in the above embodiments, the operation of the drive unit is explained for the case, in which the shift lever 7 is intentionally slowly moved by the vehicle driver from the "N" position to the "D" position. However, the present invention can be also applied to the case, in which the shift lever 7 is changed from the "N" position to the "R" position.

What is claimed is:

1. An automatic transmission of a motor vehicle comprising:
    an oil pressure source for supplying working oil with a certain oil pressure;
    multiple hydraulic control portions for changing gears upon receiving oil pressure from the oil pressure source; and
    a drive unit for selectively communicating the oil pressure source with one of the hydraulic control portions in accordance with a shift position of a shift lever to be operated by a vehicle driver,
    wherein the drive unit comprises;
    a hydraulic circuit changing device, which is mechanically operated by the shift lever and changes a hydraulic circuit, so that one of the hydraulic control portions is selectively communicated with the oil pressure source;
    a position detecting device for continuously detecting a position of one of moving members of the hydraulic circuit changing device, and for outputting a detection signal corresponding to the position of the moving member;
    a pressure regulating device provided between the hydraulic circuit changing device and the hydraulic control portions for regulating a control oil pressure to be applied to the hydraulic control portions; and
    an electronic control unit for calculating a rate of changes in the detection signals from the position detecting device and for controlling the pressure regulating device in accordance with the rate of the changes in the detection signals.

2. The drive unit according to claim 1, wherein
    the hydraulic circuit changing device comprises:
    the shift lever operated by the vehicle driver; and
    a spool movingly held in a body of the automatic transmission device and linearly moved in accordance with an operational force from the shift lever, so that the hydraulic circuit is selectively changed to one of the hydraulic control portions,
    wherein the position detecting device detects the position of the spool, so that the electronic control unit calculates the rate of changes in the detection signals from the position detecting device.

3. The drive unit according to claim 1, wherein
    the pressure regulating device is controlled by the electronic control unit only after the one of the hydraulic circuits is actually communicated with the oil pressure source through the hydraulic circuit changing device.

4. The drive unit according to claim 1, wherein
    the electronic control unit estimates a necessary time period from the present time point to a time point at which the detection signal reaches a predetermined value, based on the calculated rate of the changes of the detection signal, and
    the electronic control unit controls the pressure regulating device after the estimated necessary time period has passed.

5. An automatic transmission of a motor vehicle comprising:
    an oil pressure source for supplying working oil with a certain oil pressure;
    multiple hydraulic control portions for changing gears upon receiving oil pressure from the oil pressure source; and
    a drive unit for selectively communicating the oil pressure source with one of the hydraulic control portions in accordance with a shift position of a shift member to be operated by a vehicle driver,
    wherein the drive unit comprises;
    a hydraulic circuit changing device for changing a hydraulic circuit so that one of the hydraulic control portions is selectively communicated with the oil pressure source;
    a position detecting device for continuously detecting a position of one of moving members of the hydraulic circuit changing device, and for outputting a detection signal corresponding to the position of the moving member;
    a pressure regulating device provided between the hydraulic circuit changing device and the hydraulic control portions for regulating a control oil pressure to be applied to the hydraulic control portions; and
    an electronic control unit for calculating a rate of changes in the detection signals from the position detecting device and for controlling the pressure regulating device in accordance with the rate of the changes in the detection signals.

6. The drive unit according to claim 5, wherein
    the hydraulic circuit changing device comprises:
    the shift member operated by the vehicle driver;
    a spool movingly held in a body of the automatic transmission device; and
    an actuator for linearly moving the spool in accordance with shift position of the shift member, so that the hydraulic circuit is selectively changed to one of the hydraulic control portions,
    wherein the position detecting device detects the position of the spool, so that the electronic control unit calculates the rate of changes in the detection signals from the position detecting device.

7. The drive unit according to claim 5, wherein
    the pressure regulating device is controlled by the electronic control unit only after the one of the hydraulic circuits is actually communicated with the oil pressure source through the hydraulic circuit changing device.

8. The drive unit according to claim 5, wherein
    the electronic control unit estimates a necessary time period from the present time point to a time point at which the detection signal reaches a predetermined value, based on the calculated rate of the changes of the detection signal, and
    the electronic control unit controls the pressure regulating device after the estimated necessary time period has passed.

* * * * *